(12) United States Patent
Smith

(10) Patent No.: US 7,054,297 B1
(45) Date of Patent: May 30, 2006

(54) DISTRIBUTION OF PACKETS TO HIGH DATA RATE COMMUNICATIONS DEVICES USING MULTICAST PROTOCOLS

(75) Inventor: Malcolm M. Smith, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 1098 days.

(21) Appl. No.: 09/752,843

(22) Filed: Dec. 28, 2000

(51) Int. Cl.
*H04Q 7/24* (2006.01)

(52) U.S. Cl. ...................................... 370/338; 370/401

(58) Field of Classification Search ............... 370/328, 370/329, 330, 331, 320, 342, 340, 341, 335, 370/334, 312, 390, 401, 380, 405, 466, 392; 455/422, 437, 438, 436, 442, 440, 500, 501, 455/502

See application file for complete search history.

(56) References Cited

U.S. PATENT DOCUMENTS

| | | | | |
|---|---|---|---|---|
| 5,572,528 A | | 11/1996 | Shuen .................... 370/85.13 |
| 6,021,125 A | * | 2/2000 | Sakoda et al. .............. 370/345 |
| 6,069,871 A | * | 5/2000 | Sharma et al. .............. 370/209 |
| 6,104,709 A | * | 8/2000 | Rinchiuso et al. ......... 370/335 |
| 6,141,347 A | * | 10/2000 | Shaughnessy et al. ...... 370/390 |
| 6,151,512 A | * | 11/2000 | Chheda et al. ........... 455/562.1 |
| 6,160,999 A | * | 12/2000 | Chheda et al. ................ 455/69 |
| 6,167,248 A | | 12/2000 | Hamalainen et al. ....... 455/403 |
| 6,167,270 A | * | 12/2000 | Rezaiifar et al. ........... 455/442 |
| 6,272,148 B1 | | 8/2001 | Takagi et al. ................ 370/469 |
| 6,304,558 B1 | | 10/2001 | Mysore ....................... 370/312 |
| 6,473,411 B1 | | 10/2002 | Kumaki et al. ............. 370/331 |
| 6,487,605 B1 | | 11/2002 | Leung ......................... 709/245 |
| 6,493,328 B1 | * | 12/2002 | Fong et al. .................. 370/329 |
| 6,542,755 B1 | | 4/2003 | Tsukagoshi ................. 455/503 |
| 6,556,835 B1 | | 4/2003 | Raivisto ...................... 455/466 |
| 6,577,609 B1 | * | 6/2003 | Sharony ...................... 370/312 |
| H2072 H | | 7/2003 | Ledsham et al. ........... 455/561 |
| 6,608,832 B1 | | 8/2003 | Forslow ...................... 370/353 |
| 6,611,510 B1 | * | 8/2003 | Famolari et al. ............ 370/335 |
| 6,633,765 B1 | | 10/2003 | Maggenti .................... 455/503 |
| 6,636,502 B1 | | 10/2003 | Lager .......................... 370/352 |
| 6,647,020 B1 | | 11/2003 | Maher ......................... 370/432 |
| 6,697,349 B1 | * | 2/2004 | Mathis et al. ............... 370/338 |
| 6,717,925 B1 | | 4/2004 | Leppisaari et al. ......... 370/312 |
| 6,721,297 B1 | * | 4/2004 | Korus et al. ................ 370/338 |
| 6,738,639 B1 | | 5/2004 | Gosselin ..................... 455/519 |
| 6,747,964 B1 | * | 6/2004 | Bender ........................ 370/335 |
| 6,781,999 B1 | | 8/2004 | Eyuboglu et al. ........... 370/399 |
| 6,785,254 B1 | * | 8/2004 | Korus et al. ................ 370/338 |
| 6,804,221 B1 | * | 10/2004 | Magret et al. .............. 370/338 |

* cited by examiner

*Primary Examiner*—Chau Nguyen
*Assistant Examiner*—Ricardo Pizarro
(74) *Attorney, Agent, or Firm*—Baker Botts L.L.P.

(57) ABSTRACT

A communications system includes base transceiver stations providing wireless services for mobile units. The system further includes a packet network coupling the stations to a gateway. To distribute information received for communication to a mobile unit, the gateway may encapsulate the information as a multicast packet addressed to a multicast address. This multicast address corresponds to a multicast group associated with the mobile unit. The packet network distributes copies of the multicast packet to a group of stations that are registered for the multicast group. These stations may then communicate information from the multicast packet to the mobile unit using wireless communications techniques.

32 Claims, 4 Drawing Sheets

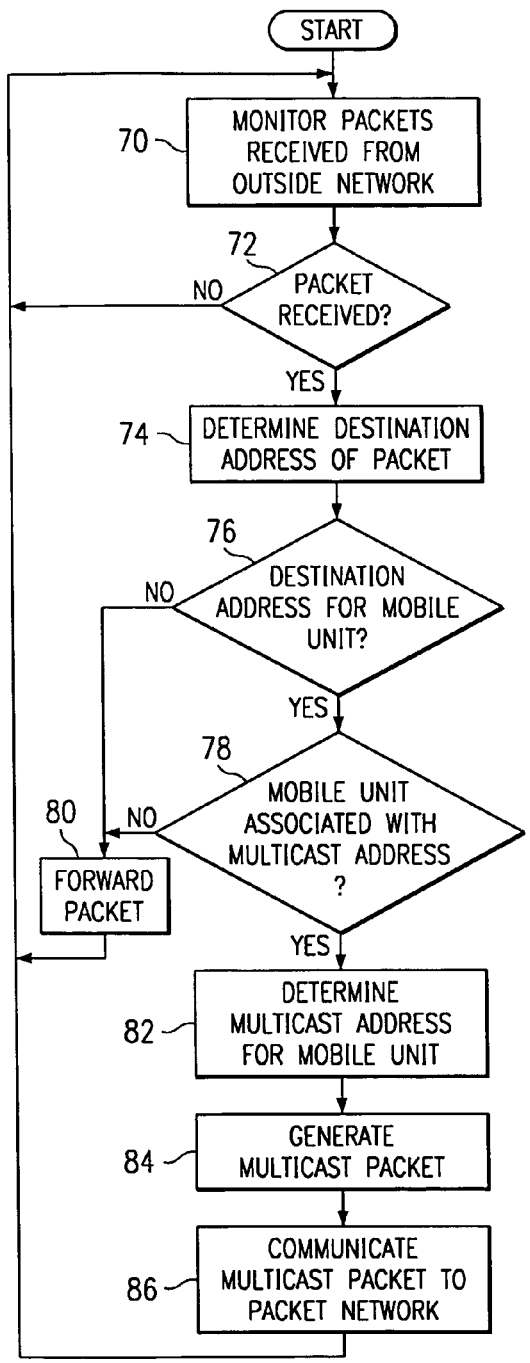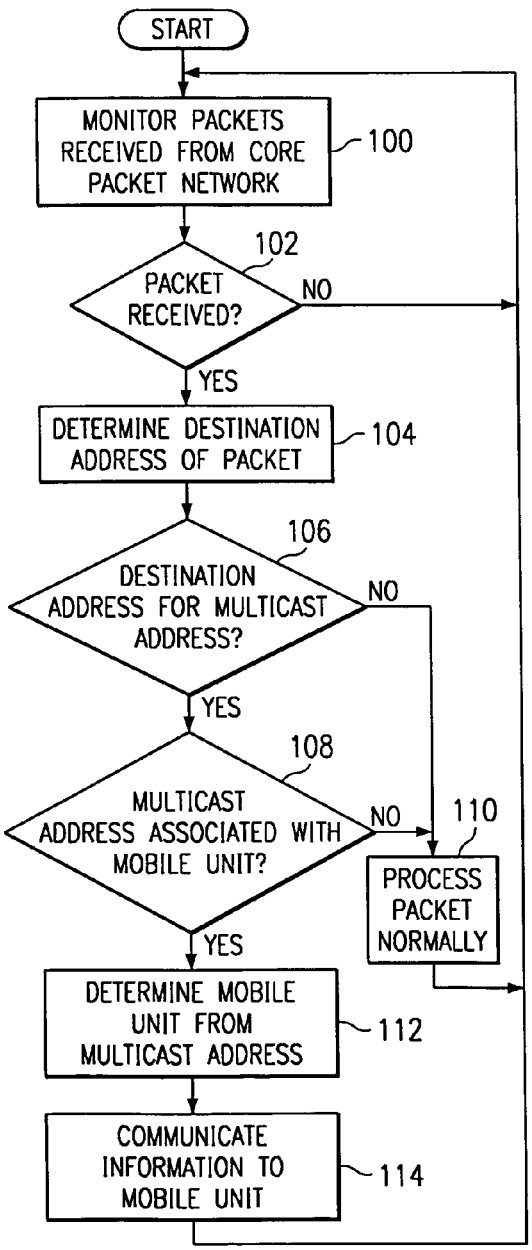
FIG. 4
FIG. 5

DISTRIBUTION OF PACKETS TO HIGH DATA RATE COMMUNICATIONS DEVICES USING MULTICAST PROTOCOLS

RELATED APPLICATIONS

This patent application is related to pending U.S. patent application Ser. No. 09/753,049 filed Dec. 28, 2000, entitled Distribution of Packets in a Wireless Communications System Using Multicast Protocols.

TECHNICAL FIELD OF THE INVENTION

The present invention relates generally to wireless communications and more particularly to distribution of packets in a wireless communications system using multicast protocols.

BACKGROUND OF THE INVENTION

Typical cellular systems include base transceiver stations that provide wireless communications for cellular phones. These base transceiver stations connect to base station controllers and transmit phone calls and other data using circuit-switched, time division multiplexed communications protocols or virtual circuit, asynchronous transfer mode (ATM) protocols. The connections between base transceiver stations and base station controllers typically support multiple communications sessions by assigning each session to a particular time-slot within frames. Thus, multiple cell phones may simultaneously establish communications sessions via one base transceiver station, and the base transceiver station uses different time-slots for each session. The management and assignment of time-slots often requires complex algorithms making tradeoffs based on a variety of factors. As the number of cell phones increases in a given area, proper management of time-slots becomes critical.

The handoff of a cell phone between base transceiver stations during a communications session exacerbates problems in time-slot management. An established session handing off to a new base transceiver station typically requires a similar time-slot on both the original and the new base transceiver station. Therefore, time division multiplexed connections may result in inefficient use of bandwidth between base transceiver stations and base station controllers and introduce complexity to time-slot management and handoff decisions for cell phones.

SUMMARY OF THE INVENTION

In accordance with the present invention, techniques for distribution of packets in a wireless communications system using multicast protocols are provided which substantially eliminate or reduce disadvantages and problems associated with previous techniques. In a particular embodiment, the present invention satisfies a need for efficient distribution of packets to multiple base transceiver stations communicating with or likely to communicate with a mobile unit.

According to one embodiment of the present invention, a communications system includes a mobile unit, a gateway, and base transceiver stations. The mobile unit monitors signals received from the base transceiver stations, chooses one of the base transceiver stations based on the signals, and requests communications from the chosen base transceiver station. The gateway receives a first packet addressed to the mobile unit, determines a multicast address associated with the mobile unit, generates a second packet having information from the first packet and addressed to the multicast address, and communicates the second packet to a packet network. The base transceiver stations each receive the second packet from the packet network, and the chosen base transceiver station communicates information from the second packet to the mobile unit.

In accordance with another embodiment of the present invention, a method for processing multicast packet determines whether a mobile unit has requested to receive communications from a base transceiver station, wherein the base transceiver station is a member of a multicast group associated with the mobile unit. The method also receives a multicast packet for the multicast group and, if the mobile unit has requested to receive communications, communicates information from the multicast packet to the mobile unit.

Various embodiments of the invention provide a number of technical advantages. A packet-switched core enables more efficient use of resources than a circuit-switched core and eliminates complexity associated with the management of time-slots. Distribution of packets using multicast addresses enables a packet-switched core to efficiently deliver copies of packets to multiple base transceiver stations. This allows a packet-switched system to support handoff of mobile units between base transceiver stations. Using multicast protocols, a packet network routes copies of a single packet to multiple base transceiver stations for delivery of the copies to a single mobile unit. That is, each base transceiver station communicating with or likely to communicate with a mobile unit may be registered for a multicast group that receives copies of each packet containing information for the mobile unit. These protocols allow a packet network to stream copies of packets to multiple base transceiver stations using a delivery tree that branches out among routers to efficiently deliver the copies. This can provide an efficient use of resources since the routers of a packet network may communicate to form a delivery tree having the fewest number of branches for communicating copies of packets to each member of a multicast group.

Other technical advantages of the present invention will be readily apparent to one skilled in the art from the following figures, descriptions, and claims.

BRIEF DESCRIPTION OF THE DRAWINGS

For a more complete understanding of the present invention and its advantages, reference is now made to the following descriptions, taken in conjunction with the accompanying drawings, in which:

FIG. 4 is a flowchart illustrating a method for generating multicast packets containing information for communication to a mobile unit;

FIG. 5 is a flowchart illustrating a method for receiving multicast packets and communicating information from the packets to a mobile unit;

communications that receives and processes multicast packets associated with a mobile unit.

DETAILED DESCRIPTION OF THE DRAWINGS

Figure 1:
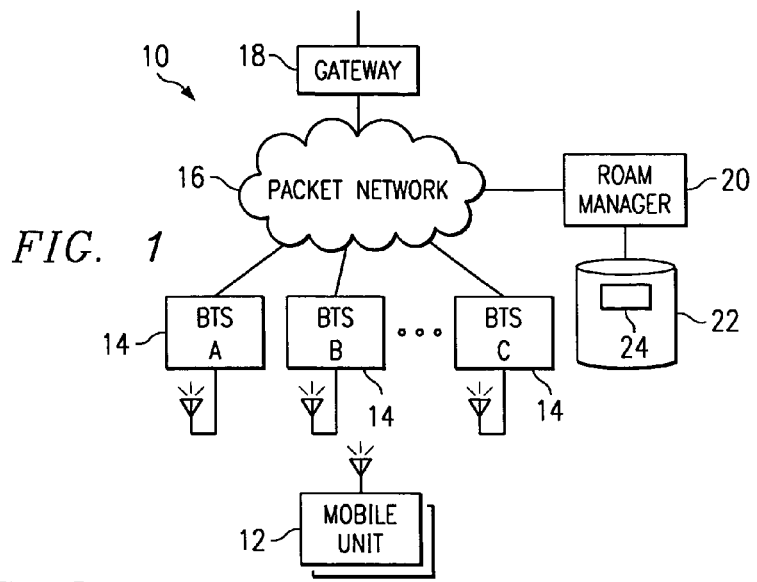
FIG. 1 illustrates a communications system having a packet-switched network supporting wireless communications with mobile units.

FIG. 1 illustrates a communications system, indicated generally at 10, that includes mobile units 12 coupled via wireless links to base transceiver stations 14. System 10 also includes a packet network 16 that couples to stations 14, a gateway 18, and a roam manager 20. In general, mobile unit 12 supports communications sessions by establishing wireless links with one or more stations 14, and packet network 16 communicates packets associated with the communications sessions to and from stations 14. More specifically, for the distribution of packets containing information for communication to mobile unit 12, packet network 16 uses multicast protocols to distribute copies of these packets to one or more stations 14. For example, gateway 18 may receive information for communication to mobile unit 12 and generate a multicast packet containing that information. Packet network 16 then distributes copies of the multicast packet to stations 14 that are in a multicast group associated with mobile unit 12.

Mobile units 12 provide wireless communications for voice, data, video, signaling, control, telemetry, and/or other transmissions using any suitable wireless communications protocols by establishing wireless links with stations 14. Mobile units 12 may be analog or digital cellular telephones, personal digital assistants (PDAs), pagers, or other suitable wireless devices providing wireless services for subscribers. Wireless links represent any channel or channels established between devices for the persistent, periodic, or sporadic communication of information, including signaling, registration, data, voice, and other information, using any suitable wireless communications protocols.

Stations 14 represent hardware and/or software supporting wireless links with mobile units 12. Stations 14 receive information from mobile units 12 in packets or receive information from mobile units 12 and packetize the information for packet-switched communication using packet network 16. Packet network 16 represents any collection and arrangement of hardware and/or software providing packet-switched communications between stations 14, gateway 18, and roam manager 20. For example, packet network 16 may include routers, bridges, gateways, switches, or other suitable network equipment providing packet-switched communications.

Gateway 18 represents hardware and/or software, such as a mobile switching center (MSC), network gateway, router, switch, or other suitable equipment, that links packet network 16 to outside networks 26. For example, gateway 18 may link to the public switched telephone network (PSTN), a global computer network such as the Internet, local area networks (LANs), wide area networks (WANs), or other communications networks. Moreover, gateway 18 may support conversions between the packet-switched communications supported by packet network 16 and protocols used by outside networks 26. For example, gateway 18 may communicate information with packet network 16 using packet-switched protocols while providing circuit-switched communications with selected outside networks 26. While this example illustrates a system having a single gateway 18, system 10 contemplates incorporating multiple gateways 18 each coupling to one or more outside networks 26.

Roam manager 20 represents hardware and/or software that monitors, manages, and controls wireless links between mobile units 12 and stations 14. As part of this management and control, roam manager 20 facilitates the handoff of mobile units 12 between stations 14. Handoff refers to any activities supporting communications between mobile unit 12 and multiple stations 14 or supporting movement of mobile units 12 between areas serviced by different stations 14 or other wireless services equipment. Moreover, handoff contemplates "soft-handoff," such as that provided by code division multiple access (CDMA) systems. Thus, roam manager 20 supports management and control of links between mobile units 12 and stations 14 to provide substantially uninterrupted communications. In addition, roam manager 20 may manage membership in multicast groups associated with mobile units 12. These multicast groups allow multiple stations 14 to receive copies of packets containing information for communication to mobile units 12. In managing membership in multicast groups, roam manager 20 registers and removes stations 14 from various multicast groups associated with mobile units 12.

While this figure illustrates roam manager 20 as a separate component, system 10 contemplates incorporating the functionalities of roam manager 20 into any suitable component or components. That is, devices in packet network 16, gateway 18, stations 14, mobile units 12, and/or other suitable equipment may provide some or all of the functions of roam manager 20. Moreover, any of the functionalities of roam manager 20 may be separated and distributed among components of system 10 and may be implemented using any suitable combination of hardware and/or software. For example, in certain wireless systems, each mobile unit 12 may monitor the strength of pilot signals received from stations 14 and communicate a list of "candidate" stations 14 (each with a relatively high potential for supporting a wireless link) to a central, decision-making component. Moreover, in a system implementing a form of High Data Rate (HDR) communications, such as CDMA 1xEV-DO (1xEvolution-Data Only) or 1xEV-DV (data and voice), mobile unit 12 may further determine, on a packet-by-packet or frame-by-frame basis, a single station 14 from which to receive communications. Thus, elements may work in coordination to effect handoff decisions and mange membership in multicast groups.

To facilitate management and control of handoff decisions and multicast group membership, roam manager 20 may access information stored in a memory 22. Memory 22 represents any one or combination of volatile or non-volatile, local or remote devices suitable for storing data, for example, random access memory (RAM) devices, read only memory (ROM) devices, magnetic storage devices, optical storage devices, or any other suitable data storage devices. In a particular embodiment, memory 22 stores multicast association information 24 that maintains information associating mobile units 12 to multicast addresses. For example, association information 24 may include a table listing identifiers for mobile units 12 corresponding to multicast addresses for each mobile unit 12. Thus, the identifiers, such as Internet protocol (IP) addresses or mobile identifiers (MINs), index to a multicast address assigned for each mobile unit 12. These multicast addresses represent designated addresses in any addressing scheme designed for the delivery of copies of a single packet to multiple recipients. For example, Internet protocol (IP) provides a range of addresses (Class D) as multicast addresses.

Roam manager 20 may dynamically or statically allocate multicast addresses to mobile units 12. For example, upon detecting mobile unit 12 within a radio access network (RAN) serviced by roam manager 20, roam manager 20 may create an entry in association information 24 associating mobile unit 12 with a multicast address. Mobile unit 12 may then remain associated with that multicast address until exiting that particular RAN. Alternatively, roam manager 20 may assign a multicast address to mobile unit 12 prior to mobile unit 12 handing off between multiple stations 14. Once handoff completes and mobile unit 12 communicates with a single station 14, roam manager 20 may reassign that multicast address. However, system 10 contemplates roam manager 20 using any suitable techniques and criteria for assigning and reassigning multicast addresses to mobile units 12.

In operation, mobile unit 12 establishes communications sessions with remote locations using wireless links with one or more stations 14. These stations 14 may use any suitable connection-oriented or connectionless, synchronous or asynchronous protocols. The establishment of a session may result from mobile unit 12 initiating a telephone call, receiving a telephone call, establishing a data session, transmitting or receiving a page, moving into a geographic region, roaming into an area, or any other suitable event. During a communications session, packet network 16 communicates packets associated with the session between gateway 18 and appropriate stations 14. For example, packet network 16 may deliver copies of outbound packets (containing information for transmission to mobile unit 12) to stations 14 currently communicating with or likely to communicate with mobile unit 12.

To deliver copies of outbound packets to multiple stations 14, elements in system 10 use multicast packet routing techniques. For example, roam manager 20 determines stations 14 communicating with (or likely to communicate with) mobile unit 12, assigns a multicast address to mobile unit 12, and registers the selected stations 14 with a multicast group identified by the multicast address. Gateway 18 receives information for communication to mobile unit 12, generates packets addressed to the multicast address assigned to mobile unit 12, and communicates these packets using packet network 16. Packet network 16 delivers copies of each of these multicast packets to stations 14 registered for the multicast group. These stations 14 may then communicate information from the multicast packets to mobile unit 12. Thus, using multicast protocols, gateway 18 can deliver copies of each outbound packet to one or more stations 14 without knowing the particular stations 14 that will receive copies. That is, packet network 16 automatically distributes copies of each multicast packet to stations 14 in the multicast group, regardless of whether the device generating the multicast packets is aware of the members of the multicast group.

For example, consider mobile unit 12, having established a communications session, communicating information for the session using wireless links with stations 14 labeled A and B (station A and station B). To receive outbound packets containing information for communication to mobile unit 12, stations A and B register or are registered for a multicast group associated with mobile unit 12. Gateway 18 need not know the members of the group, rather only a multicast address for the group. That is, using protocols such as Internet Group Management Protocol (IGMP), packet network 16 may establish routing trees for delivering multicast packets to each station 14 registered for a multicast group. Thus, gateway 18 addresses each outbound packet to the multicast address and communicates the outbound packets to packet network 16. Packet network 16 then communicates copies of each outbound packet to stations A and B.

To aid with handoffs and multicast group membership determinations, stations 14 may provide information to roam manager 20 describing communications with mobile units 12. Roam manager 20 monitors this information to make handoff decisions and/or determine membership of stations 14 in multicast groups. For example, mobile unit 12 may monitor signal strength for pilot signals received from stations 14, generate a list of candidate stations 14 indicating signal strength for a group of stations 14, and communicate this list to station 14 currently communicating with mobile unit 12. Similarly, stations 14 may monitor signals from mobile units 12 on a range of channels to detect signal information on both mobile units 12 that are currently communicating with station 14 and other mobile units 12. Station 14 reports information on signals, whether from its own monitoring or if received from other devices, to roam manager 20.

Given an appropriate triggering event, such as a signal strength dropping below or exceeding some predetermined threshold, roam manager 20 may initiate handoff of mobile unit 12 between stations 14. For example, roam manager 20 may register certain stations 14 in a multicast group associated with mobile unit 12 and direct the establishment of wireless links between mobile unit 12 and these stations 14. This allows a communications session to continue without interruption by switching between stations 14 when moving between areas serviced by different stations 14.

For example, consider mobile unit 12 entering an area serviced by station A. Station A and/or other stations 14 monitor signals received from mobile unit 12 and report this information to roam manager 20. Roam manager 20, upon detecting an appropriate condition, such as the signals exceeding some predetermined threshold, registers station A for a multicast group associated with mobile unit 12. In addition, roam manager 20 may inform station A that it has been registered for the multicast group, allowing station A to begin providing service for mobile unit 12. When roam manager 20 determines that mobile unit 12 no longer needs service from station A, roam manager 20 removes station A from the multicast group associated with mobile unit 12. For example, when mobile unit 12 moves out of the area serviced by station A, roam manager 20 may remove station A from the multicast group and inform station A to no longer provide service to mobile unit 12.

In addition to registering and removing stations 14 from multicast groups, roam manager 20 may direct the establishment of wireless links between stations 14 and mobile units 12. For example, after registering station A with a multicast group, roam manager 20 may direct station A to communicate with mobile unit 12 and direct mobile unit 12 to communicate with station A. However, system 10 contemplates stations 14 and mobile units 12 using any appropriate methods for determining when to establish wireless links and provide wireless services. For example, station A may detect its registration into a multicast group by roam manager 20 and, in response, begin providing service to mobile unit 12. In addition, while this example focuses on the registration and removal of station A in a multicast group based on mobile unit 12 moving in and out of an area serviced by station A, system 10 contemplates roam manager 20 using any suitable criteria for adding and removing stations 14 from multicast groups. Thus, roam manager 20 may manage membership in multicast groups based on geographic location, load balancing, and/or any other suitable criteria.

Moreover, while these examples focus on a separate roam manager 20 handling handoff decisions and managing membership in multicast groups, system 10 contemplates any appropriate division of these functions among various components. For example, each station 14 may monitor signals from mobile units 12 to determine mobile units 12 within an effective range of that station 14. This includes, for example, stations 14 determining all mobile units 12 that are receiving a pilot signal at a signal strength that exceeds a threshold, or mobile units 12 transmitting signals that exceed a threshold. Based on these determinations, each station 14 may register with multicast groups for mobile units 12 within range and drop from multicast groups for mobile units 12 that have moved out of range. Thus, each station 14 may manage its membership in multicast groups associated with mobile units 12. However, system 10 contemplates having any distribution or centralization of handoff and multicast group management functions.

Figure 2:
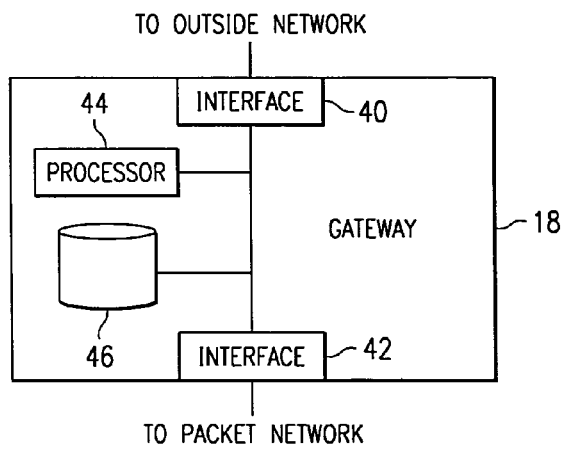
FIG. 2 is a block diagram illustrating a gateway in the communications system that supports multicasting of packets for delivery to a mobile unit.

FIG. 2 illustrates functional elements of an exemplary gateway 18 having two interfaces 40 and 42, a processor 44, and a memory 46. Gateway 40 couples to outside networks 26 using interface 40 and couples to packet network 16 using interface 42. Memory 46 maintains information for use by elements of gateway 18, such as programs for execution by processor 44, tables associating mobile units 12 with multicast addresses, and other suitable information. In general, gateway 18 provides a link to outside networks 26 and, for information received from outside networks 26 for communication to mobile units 12, provides for delivery of this information to stations 14 using multicast communications protocols.

To facilitate the operation of elements in gateway 18, memory 46 may store tables or other information associating mobile units 12 with multicast addresses. For example, memory 46 may store some or all of association information 24. As with memory 22, memory 46 represents any collection and arrangement of volatile or non-volatile, local or remote data storage devices. Moreover, because system 10 contemplates a distribution of functions, memory 46 may further represent all or part of memory 22. That is, gateway 18 may access information stored by any appropriate device in system 10.

In operation, gateway 18 receives information for communication to mobile unit 12 from outside network 26, in packet form or otherwise, using interface 40. Upon receipt, processor 44 determines whether mobile unit 12 has an associated multicast group and, if so, determines the multicast address for mobile unit 12. Processor 44 then generates a multicast packet (or packets) encapsulating this information and communicates the packet to packet network 16 using interface 42. Processor 44 may also fragment information as one or more packets and generate multicast packets encapsulating this fragmented information. Packet network 16 then communicates this multicast packet to each station 14 registered for the multicast group associated with mobile unit 12.

Thus, to deliver outbound packets containing information for delivery to mobile unit 12, gateway 18 generates packets addressed to a multicast address associated with mobile unit 12. For example, upon receiving a packet addressed to mobile unit 12, gateway 18 may encapsulate the received packet as the payload for a packet addressed to a multicast address. Or, upon receiving the packet, gateway 18 may readdress the packet by replacing the address for mobile unit 12 with the assigned multicast address. In addition, gateway 18 may receive circuit-switched or other non-packet forms of information destined for mobile unit 12. Gateway 18 reforms this information as the payload for one or more multicast packets addressed to the multicast address for mobile unit 12. However, system 10 contemplates gateway 18 using any suitable techniques for generating multicast packets for delivery to stations 14. After generating a multicast packet, gateway 18 communicates the packet to packet network 16, which communicates copies of the multicast packet to each station 14 registered for the multicast group associated with mobile unit 12. Thus, using multicast protocols, gateway 18 can deliver copies of each outbound packet to one or more stations 14.

While this example includes specific functional elements for gateway 18, system 10 contemplates gateway 18 containing any collection and arrangement of elements. Moreover, system 10 contemplates gateway 18 implementing some or all of the functions of roam manager 20. Thus, gateway 18 may manage handoff of mobile units 12 and membership of stations 14 in multicast groups associated with mobile units 12. In addition, system 10 contemplates implementing each of the functional elements within gateway 18 using any suitable combination and arrangement of hardware and/or software and implementing any of the functionalities using a computer program stored on a computer readable medium.

Figure 3:
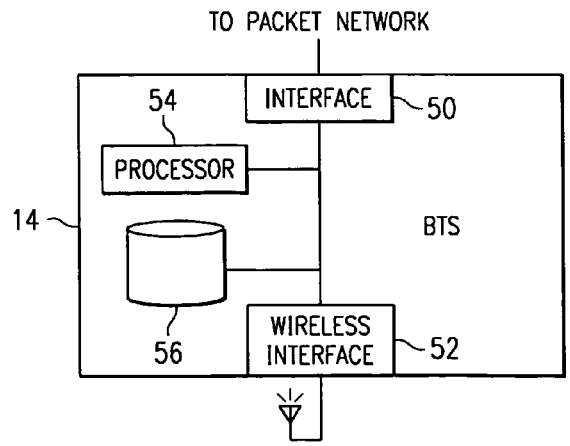
FIG. 3 is a block diagram illustrating a base transceiver station that receives multicast packets containing information for communication to a mobile unit.

FIG. 3 illustrates functional elements of an exemplary station 14 having an interface 50, a wireless interface 52, a processor 54, and a memory 56. Interface 50 couples station 14 to packet network 16, and wireless interface 52 couples station 14 to mobile units 12. Memory 56 stores information for use by elements of station 14, such as computer code for execution by processor 54, information associating mobile units 12 with multicast groups, time-slot assignments, frequency assignments, Walsh code assignments, and/or other suitable information. Processor 54 manages and controls the operation of elements within station 14. In general, station 14 provides wireless communications services for mobile units 12 and, more specifically, receives some or all information for communication to mobile units 12 as packets addressed to multicast addresses associated with mobile units 12.

To facilitate the operation of elements in station 14, memory 56 may store tables or other information associating mobile units 12 with multicast addresses. For example, memory 56 may store some or all of association information 24. In addition, as discussed with respect to memory 46 in gateway 18, memory 56 represents any collection and arrangement of volatile or non-volatile, local or remote devices suitable for data storage. Moreover, because system 10 contemplates any suitable distribution of functions, memory 56 may represent some or all of memory 22 and/or memory 46. Thus, station 14 may access information stored by gateway 18, roam manager 20, or any other suitable element in system 10 during operation.

In operation, station 14 receives information for communication to mobile units 12 from packet network 16 using interface 50. Some or all of the information received may be in the form of packets addressed to multicast addresses. Upon receiving a multicast packet, processor 54 determines mobile unit 12 identified by the multicast packet. For example, processor 54 may determine the multicast address of the multicast packet and access information in memory 56 to determine mobile unit 12 associated with that multicast address. Station 14 may communicate the multicast packet to mobile unit 12 as received or may alter or extract information from the multicast packet before communicating with mobile unit 12. For example, if gateway 18 receives packets from outside network 26 and then encapsulates these packets as payloads for multicast packets, then station 14 may extract the encapsulated packets before communicating with mobile unit 12. Alternatively, station 14 may readdress the multicast packet by replacing the multicast address with an address, such as an IP address, for mobile unit 12. However, while this description focuses on specific techniques for altering or extracting information from multicast packets, system 10 contemplates station 14 using any suitable techniques to transform information received as multicast packets into formats suitable for communication to mobile units 12.

Once in proper format, station 14 communicates information from the multicast packet to mobile unit 12 using wireless interface 52. However, in certain situations station 14 may discard multicast packets without communicating any information from the packets to mobile unit 12. For example, station 14 may become a member of a multicast group associated with mobile unit 12 in anticipation of communicating with mobile unit 12. This ensures that station 14 may immediately commence communication of information to mobile unit 12 in any appropriate circumstance, thus ensuring continuous service for mobile unit 12 and allowing seamless handoffs between stations 14. According to a particular embodiment, stations 14 communication with mobile units 12 using CDMA protocols. By distributing packets using multicast protocols, each station 14 communicating with a particular mobile unit 12 can receive packets, thus enabling soft-handoffs.

However, some communications protocols, such as High Data Rate (HDR) communications, limit the number of stations 14 that may communicate information to mobile unit 12. For example, to increase the amount of data that may be sent within a particular spectrum, the HDR communications protocol specifies that each frame of packets for communication to mobile unit 12 be sent by a single station 14. Yet, to ensure seamless handoffs between stations 14 when using protocols such as these, multiple stations 14 may be members of a multicast group associated with mobile unit 12, with only a subset of the members of the multicast group communicating information from multicast packets to mobile unit 12. By including stations 14 likely to communicate with mobile unit 12 in the multicast group, system 10 ensures that stations 14 have information available for a substantially seamless handoff between stations 14. However, until transmissions from station 14 are specified, station 14 may discard some or all multicast packets received.

As previously discussed, system 10 contemplates any appropriate distribution of functions between components. Thus, stations 14 may handle some or all of the tasks of roam manager 20, such as managing membership in multicast groups. For example, station 14 may register for multicast groups for all mobile units 12 within an effective range. That is, station 14 may register for a multicast group associated with mobile unit 12 when mobile unit 12 moves into an area serviced by station 14, when mobile unit 12 activates within the service area of station 14, when mobile unit 12 requests service from station 14, or at any other appropriate time. Station 14 may then withdraw from the multicast group associated with mobile unit 12 when mobile unit 12 moves out of the area serviced by station 14, when mobile unit 12 is no longer detected, when mobile unit 12 requests service to be discontinued, or at any other appropriate time. Moreover, station 14 may collaborate with other elements in system 10 in determining membership in multicast groups. For example, station 14 may communicate with other stations 14, gateway 18, a centralized element such as roam manager 20, and/or other appropriate elements in system 10 to aid in determining appropriate membership in multicast groups.

While this example includes specific functional elements for station 14, system 10 contemplates station 14 containing any collection and arrangement of elements. Moreover, system 10 contemplates implementing each of the functional elements within station 14 using any suitable combination and arrangement of hardware and/or software and implementing any of the functionalities using a computer program stored on a computer readable medium.

FIG. 4 is a flowchart illustrating a method for generating multicast packets for distribution to a group of stations 14, with the multicast packets containing information for communication to mobile unit 12. While the following description of this method focuses on the operation of gateway 18, however, system 10 contemplates any suitable element or elements performing these or similar steps.

Gateway 18 monitors packets received from outside networks 26 at step 70 and determines whether a packet has been received at step 72. If not, gateway 18 continues monitoring packets at step 70. However, upon receiving a packet, gateway 18 determines the destination address of the packet at step 74. If gateway 18 determines that the destination address indicates mobile unit 12, gateway 18 determines whether the indicated mobile unit 12 is associated with a multicast address at step 78. For example, gateway 18 may access association information 24 to determine whether the destination address maps to an associated multicast address. If the destination address does not indicate mobile unit 12 or is not associated with a multicast address, gateway 18 forwards the packet according to standard protocols at step 80.

However, if the destination address indicates a mobile unit that is associated with a multicast address, gateway 18 determines the multicast address for the mobile unit at step 82 and generates a multicast packet containing information from the received packet at step 84. Gateway 18 may use any suitable techniques for generating the multicast packet. For example, gateway 18 may generate the multicast packet by encapsulating the received packet as the payload for a multicast packet addressed to the multicast address. Alternatively, gateway 18 may readdress the received packet by replacing the address of mobile unit 12 with the associated multicast address. Moreover, these two methods for generating a multicast packet illustrate only specific examples, and system 10 contemplates gateway 18 using any suitable methods for generating multicast packets containing information received from outside network 26 for communication to mobile unit 12. After generating the multicast packet, gateway 18 communicates the multicast packet to packet network 16 at step 86. After appropriately handling the received packet, gateway 18 continues monitoring packets at step 70.

While this flowchart illustrates an exemplary method, system 10 contemplates using any suitable techniques and equipment for receiving information for communication to mobile units 12 and encapsulating this information in multicast packets for distribution to stations 14. In addition, many of the steps in this flowchart may take place simultaneously and/or in different orders than is shown. For example, gateway 18 may process multiple packets received simultaneously and/or process information received using a variety of different protocols. Moreover, system 10 contemplates using methods with additional steps, fewer steps, or different steps, so long as the methods remain appropriate for distributing information for communication to mobile units 12 to stations 14 using multicast packets.

FIG. 5 is a flowchart illustrating the operation of an exemplary station 14. Station 14 monitors packets received from packet network 16 at step 100 and determines whether a packet has been received at step 102. If not, station 14 continues monitoring packets at step 100. However, upon receiving a packet, station 14 determines the destination address of the packet at step 104 and whether that destination address indicates a multicast address at step 106. If the destination address indicates a multicast address, station 14 determines whether the multicast address is associated with mobile unit 12 at step 108. For example, station 14 may access information such as association information 24 to determine mobile unit 12 associated with the multicast address. If the destination address is not a multicast address or the multicast address is not associated with mobile unit 12, station 14 processes the received packet normally at step 110.

However, if the destination address is a multicast address associated with mobile unit 12, station 14 determines mobile unit 12 from the multicast address at step 112 and communicates information from the multicast packet to mobile unit 12 at step 114. As previously discussed, station 14 may transform multicast packets received from packet network 16 using any appropriate techniques before communicating with mobile unit 12. For example, station 14 may extract an encapsulated packet from the multicast packet, readdress the multicast packet to mobile unit 12, extract the information from the multicast packet for communication to mobile unit 12 in a particular time-slot, or otherwise modify the multicast packet before communicating with mobile unit 12.

While this flowchart illustrates an exemplary method, system 10 contemplates using any suitable techniques and equipment for processing multicast packets having information for communication to mobile units 12. Moreover, many of the steps in this flowchart may take place simultaneously and/or in different orders than is shown. For example, station 14 may process multiple packets received simultaneously. In addition, system 10 contemplates using methods with additional steps, fewer steps, or different steps, so long as the methods remain appropriate for processing multicast packets having information for communication to mobile units 12.

Figure 6:
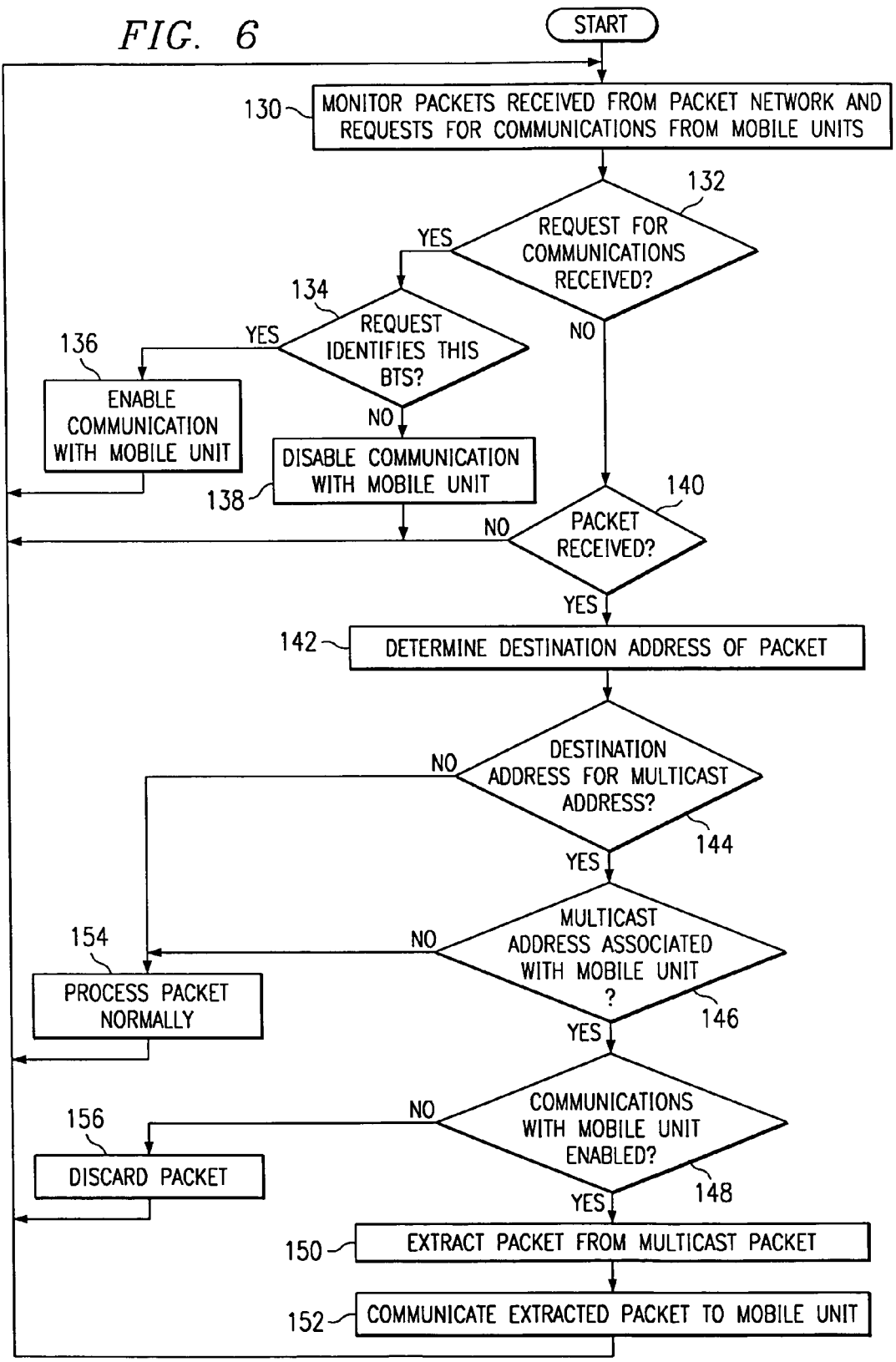
FIG. 6 is a flowchart illustrating the operation of a base transceiver station implementing High Data Rate (HDR)

FIG. 6 is a flowchart illustrating the operation of an exemplary station 14 implementing HDR communications with mobile units 12. In the particular embodiment detailed, station 14 is currently registered for a multicast group associated with mobile unit 12, and the multicast group may contain any number of other stations 14. Moreover, in this embodiment, mobile unit 12 determines selected stations 14 from which to receive packets. For example, on a frame-by-frame basis, mobile unit 12 may select an individual station 14 to communicate packets.

Station 14 monitors packets received from packet network 16 and requests for communications from mobile units 12 at step 130. Upon receiving a request for communications at step 132, station 14 determines whether the request identifies this station 14 at step 134. If so, station 14 enables communications with mobile unit 12 at step 136. If not, station 14 disables communications with mobile unit 12 at step 138. However, while this example illustrates station 14 monitoring requests from mobile unit 12 to determine when to enable and disable communications, system 10 contemplates station 14 using any appropriate methods for determining whether to enable communications according to the particular protocols being used for communications.

If station 14 receives a packet at step 140, station 14 determines a destination address of the packet at step 142. If station 14 determines that the destination address is for a multicast address at step 144, station 14 determines whether the multicast address is associated with mobile unit 12 at step 146. If the destination address is not for a multicast address associated with mobile unit 12, station 14 processes the packet normally at step 154. However, if the destination address is for a multicast address associated with mobile unit 12, station 14 determines whether communications are enabled with mobile unit 12 at step 148. If so, station 14 extracts the packet encapsulated within the multicast packet at step 150 and communicates the extracted packet to mobile unit 12 at step 152. However, if communications are not enabled with mobile unit 12, station 14 discards the packet at step 156.

While this flowchart illustrates an exemplary method, system 10 contemplates using any suitable techniques and equipment for processing multicast packets containing information for communication to mobile units 12 using communications protocols such as HDR communications. For example, station 14 may use similar techniques for any protocol in which station 14 may receive multicast packets that are not to be communicated to mobile unit 12. In addition, many of the steps in this flowchart may take place simultaneously and/or in different orders than as shown. For example, station 14 may simultaneously process multiple requests for communications and/or multiple packets received simultaneously from packet network 16. Moreover, system 10 contemplates using methods with additional steps, fewer steps, or different steps, so long as the methods remain appropriate for processing multicast packets containing information for communication to mobile units 12.

Figure 7:
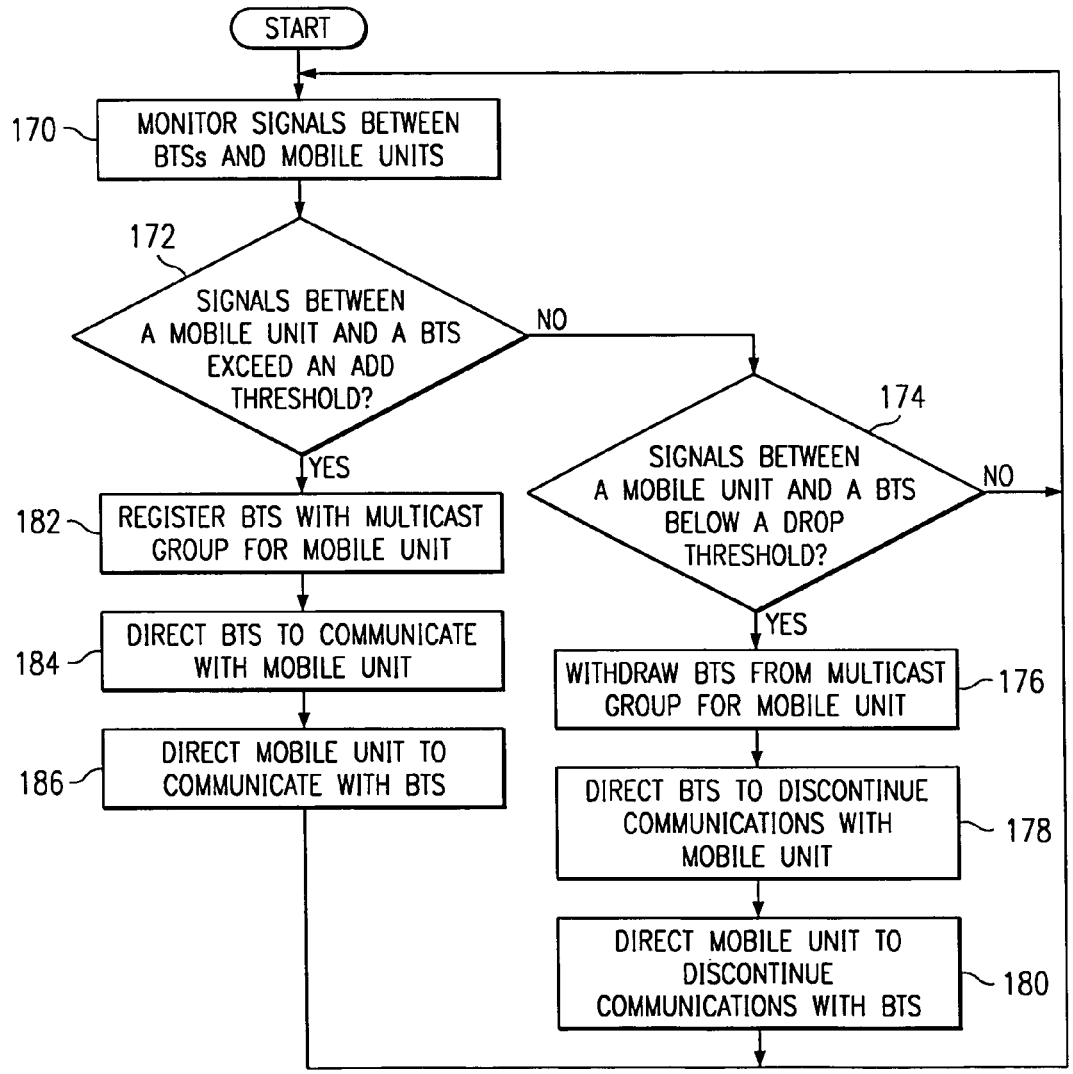
FIG. 7 is a flowchart illustrating a method for managing a multicast group containing base transceiver stations communicating with a mobile unit.

FIG. 7 is a flowchart illustrating a method for managing handoffs and membership of stations 14 in multicast groups. The following description focuses on the operation of roam manager 20, however, as previously discussed, system 10 contemplates any suitable division of these functions and any appropriate elements in system 10 implementing some or all of these functions.

Roam manager 20 monitors signals, for example, to determine radio link quality, between stations 14 and mobile units 12 at step 170. This information may be reported by stations 14, mobile units 12, or other devices monitoring communications between stations 14 and mobile units 12. Roam manager determines whether signals between a particular mobile unit 12 and a particular station 14 exceed an add threshold at step 172. For example, roam manager 20 may monitor signal strength of signals between mobile unit 12 and station 14 currently not registered with a multicast group associated with mobile unit 12. This determines whether to add station 14 to the multicast group for mobile unit 12. If those signals do not exceed the add threshold, roam manager 20 determines whether signals between some mobile unit 12 and station 14 are below a drop threshold at step 174. For example, roam manager 20 may monitor signal strength for signals between mobile unit 12 and station 14 that is currently registered for a multicast group associated with mobile unit 12. This determines whether roam manager 20 should remove station 14 from the multicast group associated with mobile unit 12 and discontinue communications between station 14 and mobile unit 12. If roam manager 20 does not detect a particular station 14 for adding to a multicast group at step 172 and does not detect a particular station 14 for removing from a multicast group at step 174, roam manager 20 continues monitoring signals between stations 14 and mobile units 12 at step 170.

However, if roam manager 20 identifies a particular station 14 for adding to a multicast group, roam manager 20 registers that particular station 14 with the multicast group for mobile unit 12 at step 182, directs station 14 to communicate with mobile unit 12 at step 184, and directs mobile unit 12 to communicate with station 14 at step 186. For example, in a CDMA system, roam manager 20 may direct station 14 to communicate with mobile unit 12 on a particular Walsh code/frequency pair and direct mobile unit 12 to receive communications from station 14 on a particular Walsh code/frequency pair. Thus, station 14 and mobile unit 12 establish a wireless link supporting the establishment of communications sessions, and the registration of station 14 in the multicast group enables station 14 to receive multicast packets containing information for these communications sessions. Similarly, if roam manager 20 determines that a particular station 14 should be removed from a multicast group, roam manager 20 withdraws station 14 from the multicast group for mobile unit 12 at step 176, directs station 14 to discontinue communications with mobile unit 12 at step 178, and directs mobile unit 12 to discontinue communications with station 14 at step 180.

While this flowchart illustrates an exemplary method, system 10 contemplates using any suitable techniques and equipment for managing handoffs and membership of stations 14 in multicast groups for mobile units 12. Thus, many of the steps in this flowchart may take place simultaneously and/or in different orders than is shown. For example, roam manager 20 may simultaneously monitor signals from multiple stations 14 for any number of mobile units 12 and respond appropriately to any conditions indicating a need for adding or removing stations 14 from multicast groups. In addition, system 10 contemplates using methods with additional steps, fewer steps, or different steps, so long as the methods remain appropriate for managing membership of stations 14 in multicast groups. For example, different communications protocols may dictate different methods for making handoff decisions and directing the establishment of wireless links between mobile units 12 and stations 14. System 10 contemplates using any suitable steps for implementing multicast distribution of information for any communications systems. Furthermore, while this description details the operation of roam manager 20, system 10 contemplates any suitable components managing membership in multicast groups. Thus, as previously discussed, elements such as stations 14, gateways 18, and mobile units 12 may manage or participate in management of membership of stations 14 in multicast groups.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A communications system comprising:
  a mobile unit operable to monitor signals received from a plurality of base transceiver stations, to choose one of the base transceiver stations based on the signals, and to request communications from the chosen base transceiver station;
  a gateway operable to receive a first packet addressed to the mobile unit, to determine a multicast address associated with the mobile unit, to generate a second packet having information from the first packet and addressed to the multicast address, and to communicate the second packet to a packet network, wherein the gateway generates the second packet by readdressing the first packet to the multicast address; and
  the base transceiver stations, each base transceiver station operable to receive the second packet from the packet network, the chosen base transceiver station operable to communicate information from the second packet to the mobile unit by readdressing the second packet to the mobile unit.

2. The communications system of claim 1, wherein the signals monitored by the mobile unit comprise pilot signals transmitted by the base transceiver stations.

3. The system of claim 1, wherein the mobile unit and the base transceiver stations implement High Data Rate (HDR) wireless communications protocols.

4. The system of claim 1, further comprising a roam management module operable to:
  monitor wireless links between the mobile unit and the base transceiver stations;
  determine that radio link quality for the one of the wireless links between a selected one of the base transceiver stations and the mobile unit has fallen below a threshold; and
  withdraw the selected base transceiver station from a multicast group associated with the mobile unit.

5. The system of claim 4, wherein the roam management module determines that radio link quality for the one of the wireless links between the selected base transceiver station and the mobile unit has fallen below the threshold by determining that a signal strength has fallen below the threshold for a predetermined period of time.

6. The system of claim 1, further comprising a roam management module operable to:
  monitor radio link quality for wireless links between the mobile unit and the base transceiver stations;
  determine that radio link quality for the wireless link between a selected one of the base transceiver stations and the mobile unit has exceeded a threshold; and
  register the selected base transceiver station with a multicast group associated with the mobile unit.

7. A communications system comprising:
  a mobile unit operable to monitor signals received from a plurality of base transceiver stations, to choose one of the base transceiver stations based on the signals, and to request communications from the chosen base transceiver station;
  a gateway operable to receive a first packet addressed to the mobile unit, to determine a multicast address associated with the mobile unit, to generate a second packet having information from the first packet and addressed to the multicast, and to communicate the second packet to a packet network, wherein the gateway is further operable to generate the second packet by encapsulating the first packet as a payload for the second packet; and
  the base transceiver stations, each base transceiver station operable to receive the second packet from the packet network, the chosen base transceiver station operable to extract the first packet from the second packet and to communicate information from the second packet to the mobile unit by transmitting the first packet to the mobile unit.

8. A base transceiver station comprising:
  a wireless network interface operable to receive a multicast packet from a packet network, wherein the base transceiver station is a member of a multicast group receiving the multicast packet;

a processor operable to determine a mobile unit identified by the multicast packet and to determine whether the mobile unit has chosen the base transceiver station for communications, wherein the processor is further operable to extract a packet encapsulated in the multicast packet; and the wireless network interface operable to communicate information from the multicast packet to the mobile unit by transmitting the extracted packet to the mobile unit if the mobile unit has selected the base transceiver station for communications.

9. The base transceiver station of claim 8, wherein the wireless interface is further operable to transmit a pilot signal for reception by the mobile unit.

10. The base transceiver station of claim 8, wherein the wireless interface communicates using High Data Rate (HDR) wireless communications protocols.

11. The base transceiver station of claim 8, wherein the processor is further operable to discard the multicast packet if the mobile unit has chosen a second base transceiver station for the communications.

12. The base transceiver station of claim 8, wherein the processor is further operable to monitor radio link quality for a wireless link with the mobile unit and to withdraw from the multicast group based on the radio link quality.

13. The base transceiver station of claim 8, wherein the processor is further operable to monitor radio link qualities for wireless links with a plurality of mobile units and to register for a multicast group associated with a selected one of the mobile units based on the radio link quality of a wireless link with the selected mobile unit.

14. A base transceiver station comprising:
a wireless network interface operable to receive a multicast packet from a packet network, wherein the base transceiver station is a member of a multicast group receiving the multicast packet;
a processor operable to determine a mobile unit identified by the multicast packet and to determine whether the mobile unit has chosen the base transceiver station for communications, wherein the processor is further operable to readdress the multicast packet to an Internet protocol (IP) address for the mobile unit; and
the wireless network interface operable to communicate information from the multicast packet to the mobile unit if the mobile unit has selected the base transceiver station for communications.

15. A method for processing a multicast packet comprising:
determining whether a mobile unit has requested to receive communications from a base transceiver station, wherein the base transceiver station is a member of a multicast group associated with the mobile unit;
receiving a multicast packet for the multicast group; and
if the mobile unit has requested to receive communications, communicating information from the multicast packet to the mobile unit, wherein communicating information to the mobile unit comprises a selected one of (a) extracting a packet encapsulated in the multicast packet and communicating the extracted packet to the mobile unit and (b) re-addressing the multicast packet to an Internet protocol (IP) address for the mobile unit.

16. The method of claim 15, further comprising transmitting a pilot signal from the base transceiver station for reception by the mobile unit.

17. The method of claim 15, wherein the base transceiver station and the mobile unit implement High Data Rate (HDR) wireless communications protocols.

18. The method of claim 15, further comprising discarding the multicast packet if the mobile unit has not requested to receive communications from the base transceiver station.

19. The method of claim 15, further comprising monitoring radio link quality for a wireless link with the mobile unit and withdrawing from the multicast group associated with the mobile unit based on the radio link quality.

20. The method of claim 15, further comprising monitoring radio link qualities for wireless links with a plurality of mobile units and registering for a multicast group associated with a selected one of the mobile units based on the radio link quality for the wireless link with the selected mobile unit.

21. Software for processing a multicast packet, the software embodied on a computer readable medium and operable to:
determine whether a mobile unit has requested to receive communications from a base transceiver station, wherein the base transceiver station is a member of a multicast group associated with the mobile unit;
receive the multicast packet for the multicast group; and
if the mobile unit has requested to receive communications, communicating information from the multicast packet to the mobile unit, wherein communicating information to the mobile unit comprises a selected one of (a) extracting a packet encapsulated in the multicast packet and communicating the extracted packet to the mobile unit and (b) re-addressing the multicast packet to an Internet protocol (IP) address for the mobile unit.

22. The software of claim 21, further operable to transmit a pilot signal from the base transceiver station for reception by the mobile unit.

23. The software of claim 21, wherein the base transceiver station and the mobile unit implement High Data Rate (HDR) wireless communications protocols.

24. The software of claim 21, further operable to discard the multicast packet if the mobile unit has not requested to receive communications from the base transceiver station.

25. The software of claim 21, further operable to monitor radio link quality for a wireless link with the mobile unit and to withdraw from the multicast group associated with the mobile unit based on the radio link quality.

26. The software of claim 21, further operable to monitor radio link qualities for wireless links with a plurality of mobile units and to register for a multicast group associated with a selected one of the mobile units based on radio link quality for a wireless link with the selected mobile unit.

27. A base transceiver station comprising:
means for determining whether a mobile unit has requested to receive communications from the base transceiver station, wherein the base transceiver station is a member of a multicast group associated with the mobile unit;
means for receiving a multicast packet for the multicast group; and
means for, if the mobile unit has requested to receive communications, communicating information from the multicast packet to the mobile unit, wherein communicating information to the mobile unit comprises a selected one of (a) extracting a packet encapsulated in the multicast packet and communicating the extracted packet to the mobile unit and (b) re-addressing the multicast packet to an Internet protocol (IP) address for the mobile unit.

28. The base transceiver station of claim 27, further comprising means for transmitting a pilot signal for reception by the mobile unit.

29. The base transceiver station of claim 27, further comprising means for implementing High Data Rate (HDR) wireless communications protocols.

30. The base transceiver station of claim 27, further comprising means for discarding the multicast packet if the mobile unit has not requested to receive communications from the base transceiver station.

31. The base transceiver station of claim 27, further comprising monitoring radio link quality for a wireless link with the mobile unit and means for withdrawing from the multicast group associated with the mobile unit based on the radio link quality.

32. The base transceiver station of claim 27, further comprising means for monitoring radio link qualities for wireless links with a plurality of mobile units and means for registering for a multicast group associated with a selected one of the mobile units based on radio link quality for a wireless link with the selected mobile unit.

* * * * *